(12) United States Patent
Schuette et al.

(10) Patent No.: US 11,086,813 B1
(45) Date of Patent: Aug. 10, 2021

(54) MODULAR NON-VOLATILE MEMORY EXPRESS STORAGE APPLIANCE AND METHOD THEREFOR

(71) Applicant: Sanmina Corporation, San Jose, CA (US)

(72) Inventors: Franz Michael Schuette, Colorado Springs, CO (US); Daniel M. Gale, Colorado Springs, CO (US); Charles C. Hill, Portland, OR (US); Matthew T. Bowman, San Jose, CA (US); Ritesh Kumar, Colorado Springs, CO (US)

(73) Assignee: Sanmina Corporation, San Jose, CA (US)

( * ) Notice: Subject to any disclaimer, the term of this patent is extended or adjusted under 35 U.S.C. 154(b) by 0 days.

(21) Appl. No.: 15/997,686

(22) Filed: Jun. 4, 2018

Related U.S. Application Data

(60) Provisional application No. 62/514,604, filed on Jun. 2, 2017.

(51) Int. Cl.
*G06F 13/42* (2006.01)
*G06F 13/40* (2006.01)
*G06F 13/16* (2006.01)

(52) U.S. Cl.
CPC ...... *G06F 13/4282* (2013.01); *G06F 13/1668* (2013.01); *G06F 13/4022* (2013.01); *G06F 2213/0026* (2013.01)

(58) Field of Classification Search
CPC .......... G06F 13/16; G06F 13/40; G06F 13/42; G06F 2213/0026
See application file for complete search history.

(56) References Cited

U.S. PATENT DOCUMENTS

| | | | |
|---|---|---|---|
| 6,438,604 B1 * | 8/2002 | Kuver | H04L 12/40058 348/E7.081 |
| 2016/0210062 A1 * | 7/2016 | McCambridge | G06F 3/0613 |
| 2017/0351639 A1 * | 12/2017 | Borikar | G06F 15/17331 |
| 2018/0192540 A1 * | 7/2018 | Kumar | H05K 7/1492 |
| 2018/0232334 A1 * | 8/2018 | Oved | G06F 13/4282 |

* cited by examiner

*Primary Examiner* — Eric T Oberly
(74) *Attorney, Agent, or Firm* — Loza & Loza, LLP; Julio M. Loza

(57) ABSTRACT

A network-attached storage device is provided comprising a network card with an embedded operating system that provides autonomous operation of the network card, the network card including a network port to communicate with an external device and a peripheral component interconnect express (PCIe) interface to couple to a first PCIe device in the absence of a system host processor.

17 Claims, 13 Drawing Sheets

MODULAR NON-VOLATILE MEMORY EXPRESS STORAGE APPLIANCE AND METHOD THEREFOR

CLAIM OF PRIORITY UNDER 35 U.S.C. § 119

The present Application for Patent claims priority to U.S. Provisional Application No. 62/514,604 entitled "Modular Non-Volatile Memory Express Storage Appliance and Method Thereof", filed Jun. 2, 2017, and assigned to the assignee hereof and hereby expressly incorporated by reference herein.

FIELD

The present disclosure generally relates to memory devices for use with server computers and other processing apparatuses. More particularly, the present disclosure relates to a modular design of high density arrays of non-volatile memory express (NVMe) mass storage devices.

BACKGROUND

Non-Volatile Memory Express (NVM Express or NVMe) is a low latency protocol for accessing non-volatile memory devices over a peripheral component interconnect express (PCIe) interface without the need of a host bus adapter (HBA). FIG. 1 is a block diagram illustrating a typical Peripheral Component Interconnect Express (PCIe) system 100 with various NVMe device topologies.

First, in the simplest case, a PCIe endpoint/device A 106a and/or a PCIe endpoint/device B 106b (e.g., an NVMe drive) may be directly attached or coupled to a processing circuit 102 (e.g., central processing unit or CPU) via a PCIe root complex 104. The PCIe root complex 104 is an interface between the processing circuit 102 (e.g., CPU cores) and its memory subsystem 112 including the memory bus 114, and PCIe buses 116 and 118 and may include several individual controllers with one or more downstream ports. The root complex 104 or root complex functionality may be implemented as a discrete device, or may be integrated with the processing circuit 102 (e.g., a CPU or processor). The root complex 104 may include more than one PCIe port and one or more switch devices 108 can be connected to ports on the root complex 104 or cascaded (e.g., coupled in series).

The PCIe root complex 104 may generate transaction requests on behalf of the processing circuit 102 (or CPU cores), which can include data to be communicated to the upstream ports of specific PCIe endpoints 106a, 106b, 110a, and/or 110b (e.g., NVMe devices) and data addresses indicative of the specific endpoint (e.g., name spaces). However, often this direct-attached topology limits the number of PCIe endpoints (e.g., NVMe devices) that can be installed in the system 100 to a fraction of the available PCIe lanes supported by the processing circuit 102.

Second, a more elaborate architecture involves a switch fabric topology 108 which arbitrates the available PCIe lanes 116 to the different PCIe endpoints 110a and 110b (e.g., NVMe devices or drives). In both cases, it is common to have a server class CPU (e.g., processing circuit 102) with enough computing power to service the different requests and simultaneously perform additional computational tasks.

Yet another strategy entails disaggregation of the actual compute node and the PCIe endpoint, such as an NVMe storage array. In general, this strategy is referred to as NVMe over Fabric (NVMeoF) since it provides access of the server to the NVMe drives via a switch fabric. The switch fabric 108 may use PCIe, FibreChannel, Ethernet or other suitable protocols. This means that there is a high end compute node mostly tasked with high end computing and a secondary NVMe storage array appliance connected via the switch fabric 108. This approach somewhat simplifies the design of the different system components and distributes power consumption and heat dissipation/cooling requirements, albeit at the expense of a small increase in latency and cabling requirements.

Depending on the type of fabric, the NVMe storage array appliance or NVMe appliance/device may have, in most cases, a low power processor 120, which may be, for example, an x86 instruction set architecture (ISA) CPU or a dedicated reduced instruction set computing (RISC) (e.g. Acorn RISC machine (ARM)) processor customized to handle NVMe requests. In this case, no or very few general purpose compute x86 tasks are executed by the low power processor 120. Instead, the processing circuit 102 may handle tasks like encryption/decryption, on-the-fly compression/decompression of data, and deduplication to mention the most common workloads.

Despite the disaggregation of server and appliances/devices, current NVMe appliances are hindered by the lack of connectivity and root complex designs which limit the number of NVMe devices (e.g., drives) that can be supported. Given these limitations, a more modular and flexible approach is needed to increase efficiency, performance and ease of integration of NVMe devices with host systems.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details.

In the following description, certain terminology is used to describe certain features of one or more embodiments. The term "non-volatile memory device" may refer to a hard disk drive (HDD), a solid state drive (SSD), or any type of device for storing data. Additionally, the term "non-volatile memory device" may refer to other technologies, such as NVMe technology, for storing data on non-volatile memory devices.

The present disclosure is directed to solving the problems of the design complexity of monolithic storage appliances using non-volatile memory devices. The term non-volatile memory is used to describe any type of non-volatile memory including but not limited to NAND flash, NOR flash, 3d Crosspoint (3DXP), phase change memory (PCM), resistive random access memory (ReRAM; RRAM), various permutations of magnetic random access memory (MRAM), graphene-based and optical memories.

NVMe is a technology geared towards eliminating the complexity and latency of protocol translation as they exist in small computer system interfaces (SCSI), for example in serially attached SCSI (SAS). Instead, NVMe devices are communicating with a host system over the native PCIe protocol. Using direct attached NVMe mass storage devices, the number of NVMe devices is limited by the number of PCIe controllers integrated in the host processor. Additional limitations are incurred by the 8-bit PCIe device address space which limits the number of PCIe and by extension, the number of NVMe devices to 256 devices per host, even if the different PCIe lanes are arbitrated to the individual devices via switches.

The above mentioned limitations have led to the trend of disaggregation of NVMe storage devices from the actual computing nodes, resulting in what is generally referred to as NVMe over Fabric or network. The Fabric is a high speed interconnect network which may embrace any suitable protocol as for example high speed Ethernet or Fibre Channel or any permutation thereof as Fibre Channel over Ethernet (FCoE) and similar.

Figure 1:
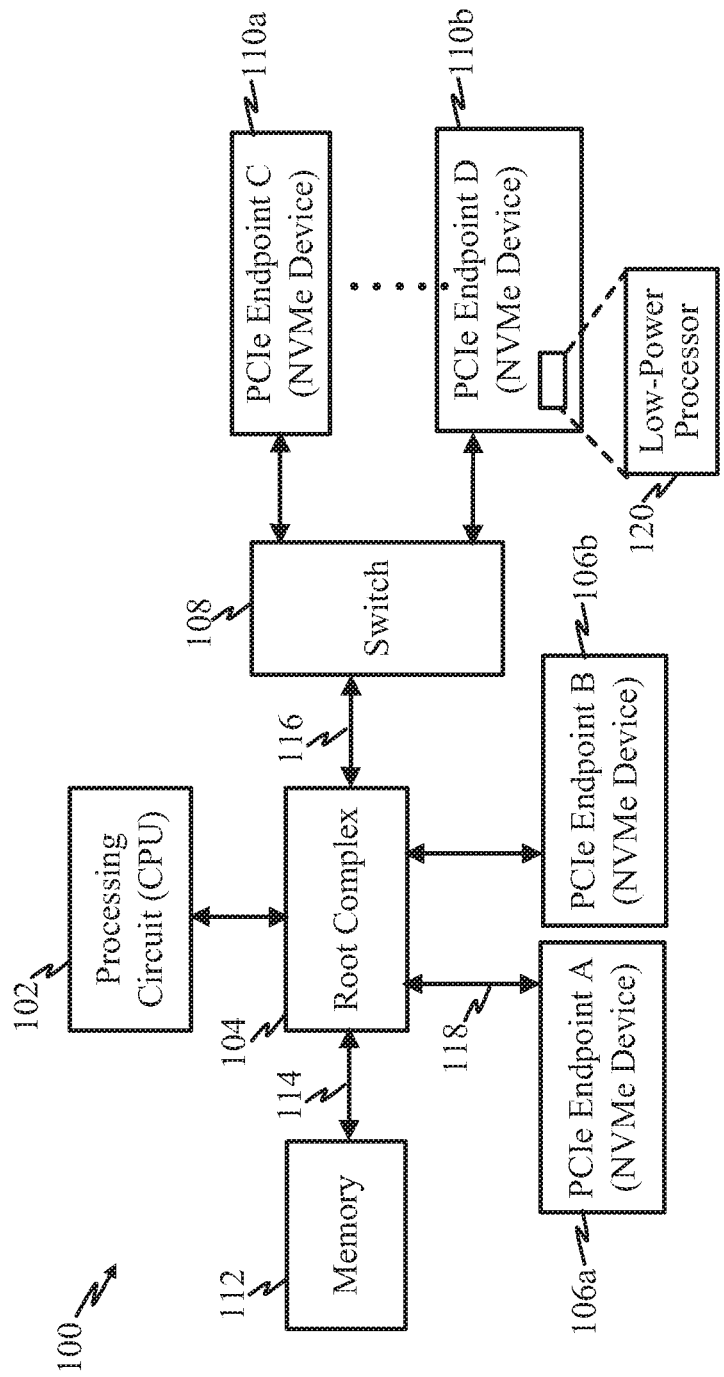
FIG. 1 is a block diagram illustrating a typical Peripheral Component Interconnect Express (PCIe) system with various NVMe device topologies.
Figure 2:
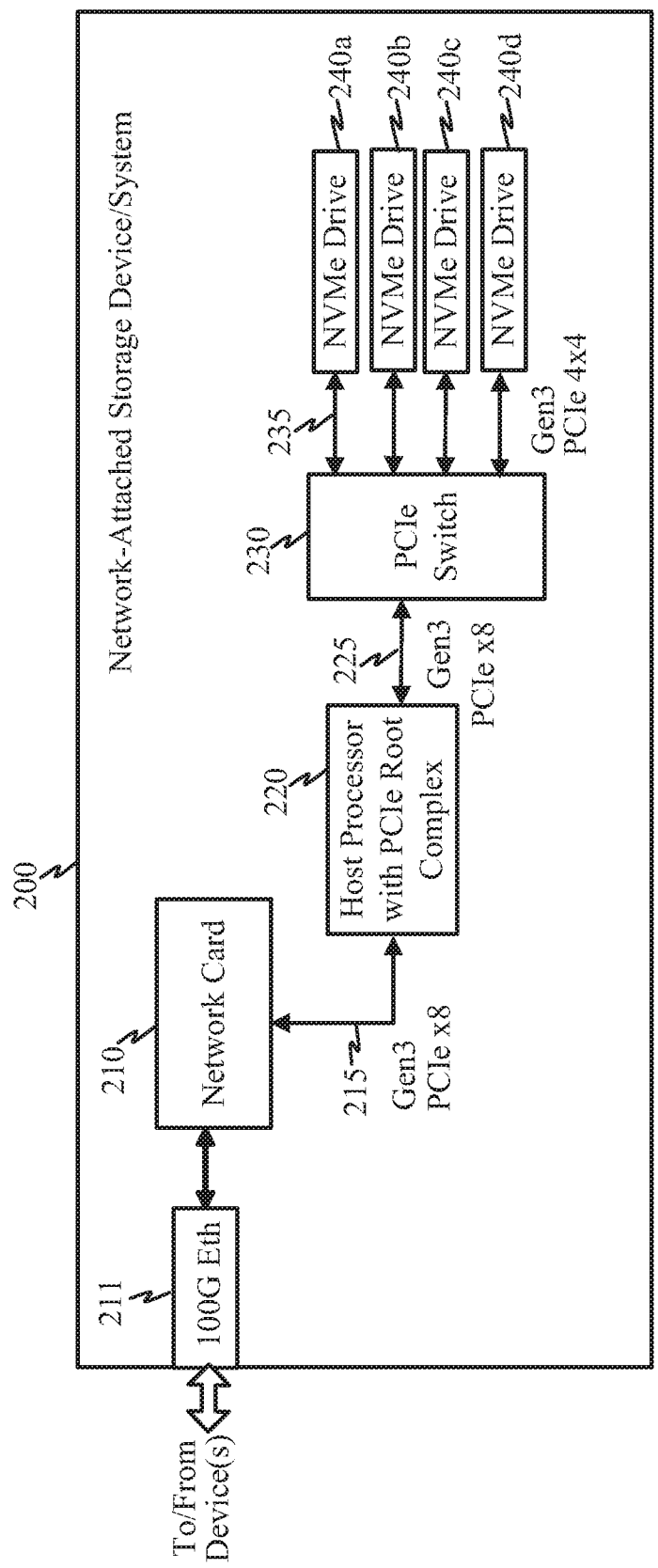
FIG. 2 illustrates a conventional network-attached storage device/system including NVMe storage devices.

FIG. 2 illustrates a conventional network-attached storage device/system 200 including NVMe storage devices. The network-attached storage device/system 200 may include a plurality of NVMe mass storage devices 240a-d that are accessed through a network card 210 with a high speed network connector 211. The network card 210 may include a PCIe endpoint functionally coupled through a first set of PCIe lanes 215 to a motherboard with a host processor 220 which then provides a PCIe root port (part of a root complex within the host processor 220) to communicate with a PCIe switch 230 through a second set of PCIe lanes 225. The PCIe switch 230 communicates with the NVMe drives 240a-d via a third set of PCIe lanes 235. The PCIe switch 230 acts as an expander to increase the number of NVMe drives 240a-d that may be coupled to the host processor 220. However, this design only shifts the burden of integration away from a fully integrated NVMe server to the network-attached storage device/system 200. Moreover, fully fledged motherboards consume a lot of valuable real estate in the network-attached storage device/system 200.

Figure 3:
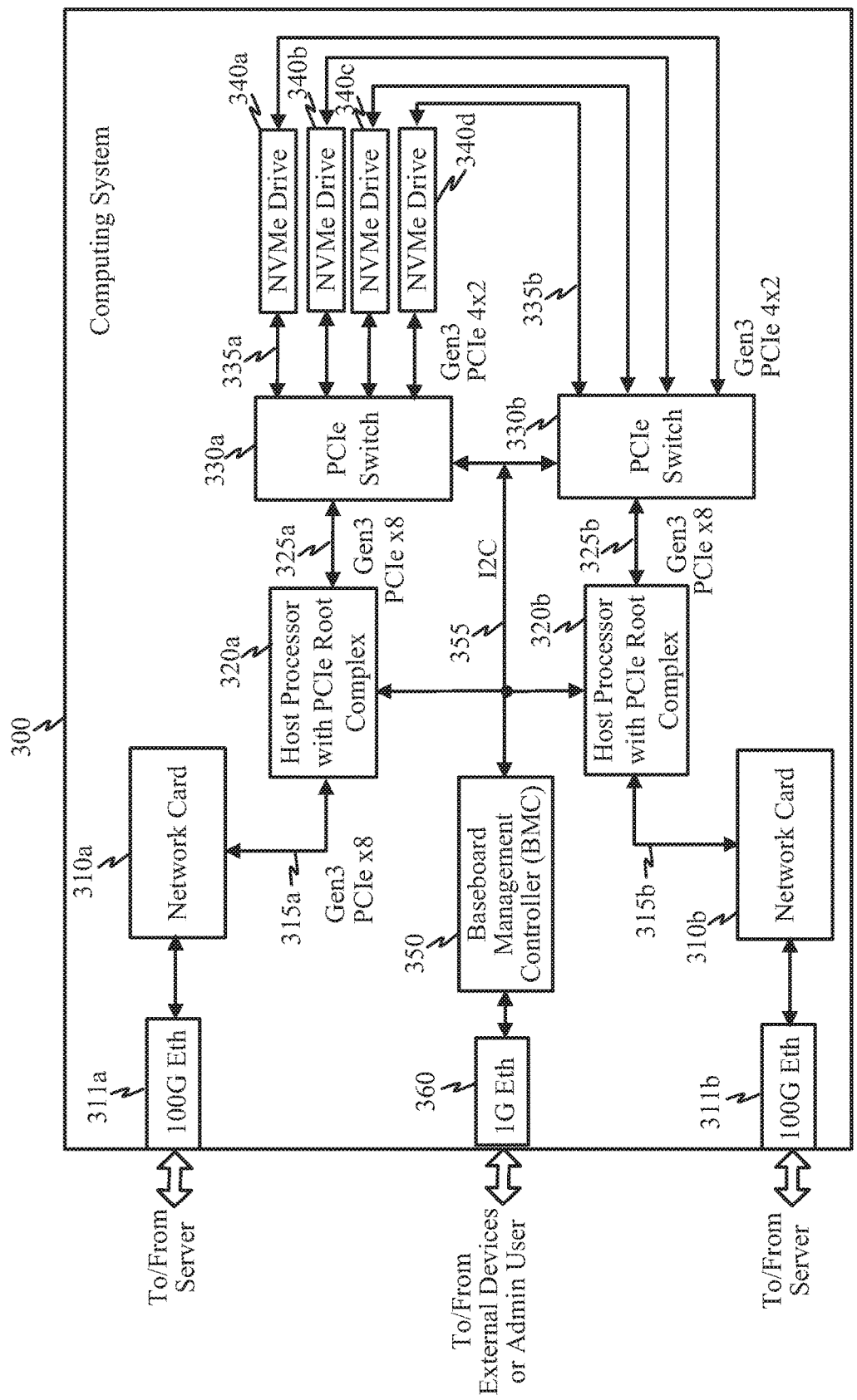
FIG. 3 illustrates a high availability network-attached storage device/system including dual ported NVMe storage devices.

FIG. 3 illustrates a high availability network-attached storage device/system 300 including dual ported NVMe storage devices 340. The high availability network-attached storage device/system 300 may include two host processors 320a and 320b, two network cards 310a and 310b physically and functionally integrated with a pair of high speed network ports 311a and 311b, respectively. The network cards 310a and 310b may provide an additional interface between the external device(s) and are connected to the host processors 320a and 320b via a Gen 3 PCIe interface/bus 315a and 315b. The host processor may include an integrated PCIe root complex and is connected to a PCIe switch 330a and 330b to bifurcate upstream PCIex8 lanes 325a and 325b into four PCIex2 lanes 335a and 335b, which then exchange signals and/or data with a plurality of dual ported NVMe storage devices (e.g., drives) 340a-d. In this case, if one of host processors 320a or 320b fails, all NVMe storage devices (drives) 340a-d are still accessible through the remaining host processor 320a or 320b. Switch configurations and power management may be handled by a base board management controller (BMC) 350 coupled to external users and/or devices through a low speed Ethernet port 360 and coupled to the host processors 320a and 320b and the PCIe switches 330a and 330b through an I2C bus 355 (e.g., a control/signaling bus).

Both conventional network cards 210, 310a, and 310b, NVMe devices/drives 340 and 340 illustrated in FIGS. 2 and 3 are PCIe endpoints that cannot establish peer-to-peer communication with each other without going through a PCIe root complex. As such, in current systems, in order for network devices to communicate with other PCIe endpoints (e.g., an NVMe device/drive), the network devices must communicate through another device (e.g., host processor 220 or 320) that has a PCIe root complex.

Figure 4:
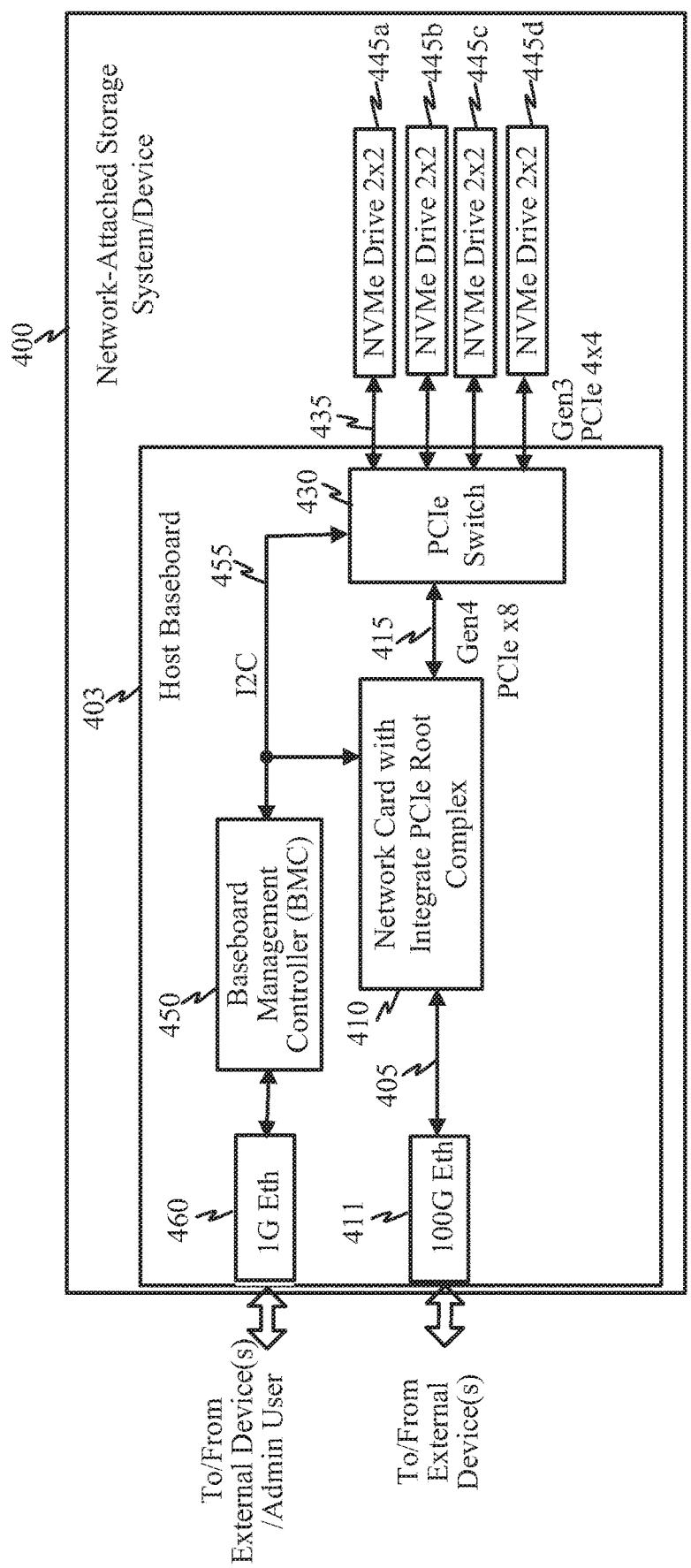
FIG. 4 is a block diagram illustrating an exemplary network-attached storage system/device providing peer-to-peer connectivity via a network card with integrated root complex functionality.

FIG. 4 is a block diagram illustrating an exemplary network-attached storage system/device 400 providing peer-to-peer connectivity via a network card with integrated root complex functionality. The network-attached storage system/device 400 may include a baseboard 403 and a plurality of NVMe mass storage devices 445a-d. The baseboard 403 may be devoid of a host processor, but instead includes a network card with integrated PCIe root complex 410, a baseboard management controller, a network port 411, and a management port 460.

The network card 410 may be autonomous and have its own boot device with an embedded operating system (e.g., stored within an integrated flash memory or a serial advanced technology attachment (SATA) device) and an integrated PCIe root complex with a number of available PCIe lanes 415 configured to communicate with a plurality of NVMe mass storage devices 445a-d. In this manner, the network card 410 is not dependent on any external host processor or system to facilitate transfer of data between one or more external devices (via the network port 411 and the one or more NVMe mass storage devices 445a-d). In some implementations, the network card 410 may be inserted into a PCIe slot of a baseboard 403.

The integrated baseboard management controller (BMC) 450 (e.g., an Emulex Pilot3 or ASPEED AST2500 controller) may serve to provide control signaling to the network card 410, the PCIe switch 430, and/or the NVMe mass storage device 445*a-d* (via the PCIe switch 430). The BMC 450 interfaces with external users and/or external devices through a low speed management (Ethernet) port 460 or a universal asynchronous receiver/transmitter (UART) to universal serial bus (USB) bridge which may present the BMC 450 as a Universal Serial Bus (USB) target device. The BMC 450 may also use an I2C bus 455 to control the high speed PCIe switch 430 and, for example, set one or more PCIe switch 430 partitions and/or port configurations, and may further control the network card 410.

The baseboard 403 may be devoid of any host processor that would normally help manage communications between the external devices (via the network port 411) and the NVMe storage devices 445*a-d*. Instead, such communications between the external devices (via the network port 411) and the NVMe storage devices 445*a-d* may be autonomously (e.g., without assistance of an external host processor or system) managed internally by the network card with its integrated PCIe root complex. That is, rather than relying on a host processor to manage/arbitrate communications over the PCIe bus 415, this PCIe bus is managed by the network card 410.

The PCIe switch 430 itself can be configured to have any number of upstream and downstream ports and may be partitioned to communicate with more than one root port (one per partition) through the upstream ports and the NVMe devices 445 presenting themselves as endpoints through the downstream ports. This allows for flexible configurations. For example, both ports of an NVMe device 445*a-d* may be functionally connected to a single root complex. In another example, the two ports of an NVMe device 445*a-d* may be allocated to different partitions and, by extension, to different root complexes on different network cards. The PCIe switch 430 may also provide buffering of data to converge traffic from several lower speed lanes into a reduced number of high speed lanes that is converging from a wide low speed bus to a narrow high speed bus.

In another exemplary aspect, the autonomous network card 410 with integrated root complex routes eight PCIe lanes 415 at PCIe Gen4 speed to eight upstream ports in one partition of a PCIe Gen4 switch 430. The signals are buffered within the switch 430 and signals from each upstream PCIe Gen4 lane 415 are forwarded through two downstream PCIe lanes 435 at Gen3 speed. The result is a total of 16 PCIe Gen3 lanes that are communicating with four NVMe drives 445 having a Gen3 PCIe×4 interface. The aggregate bandwidth of upstream and downstream lanes is substantially the same.

Figure 5:
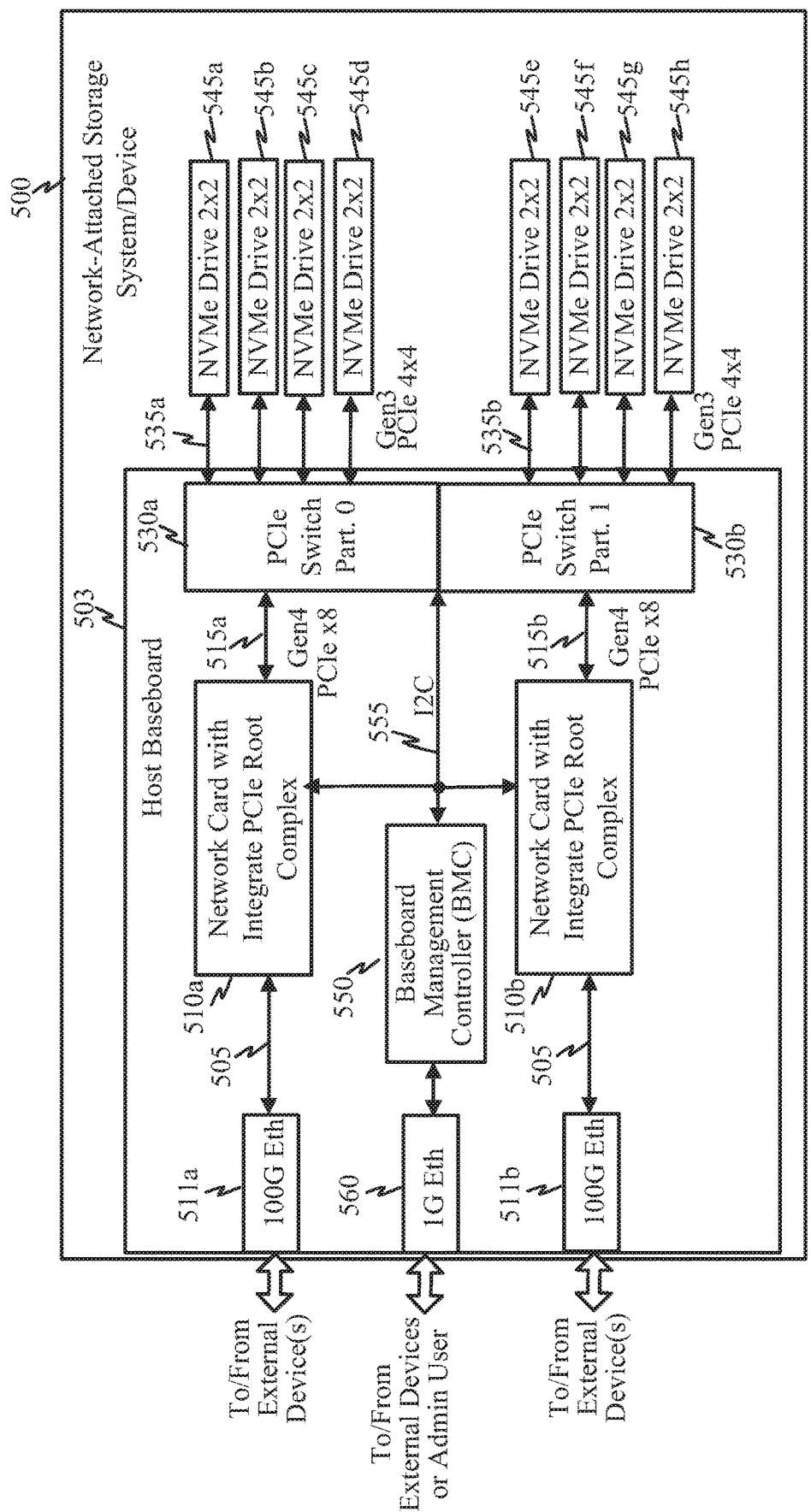
FIG. 5 is a block diagram illustrating an exemplary network-attached storage system/device providing dual peer-to-peer connectivity via dual network cards with integrated root complex functionality.

FIG. 5 is a block diagram illustrating an exemplary network-attached storage system/device 500 providing dual peer-to-peer connectivity via dual network cards with integrated root complex functionality. The network-attached storage system/device 500 may include a baseboard 503 and a plurality of NVMe mass storage devices 545*a-h*. The baseboard 503 may be devoid of a host processor, but instead includes a plurality of network cards with integrated PCIe root complex 510*a* and 510*b* and having a plurality of network ports 511*a* and 511*b*, a baseboard management controller 550, and a management port 560.

Each of the network cards 510*a* and 510*b* may be autonomous and have its own boot device with an embedded operating system (e.g., stored within an integrated flash memory or a serial advanced technology attachment (SATA) device) and an integrated PCIe root complex with a number of available PCIe lanes 515*a* and 515*b* configured to communicate with the plurality of NVMe mass storage devices 545*a-d*.

Like the network card 410 of FIG. 4, each of the network cards 510*a* and 510*b* include integrated PCIe root complex functionality, allowing them to manage communications over their respective PCIe bus without the need for an external host processor. In one example, the network cards 510*a* and 510*b* may be directly coupled via a Gen4 PCIe×8 link 515*a* and 515*b* to a high port count PCIe switch 530 (i.e., comprising first PCI switch partition 530*a* and second PCI switch partition 530*b*) configured to have two partitions 530*a* and 530*b*. Each switch partition 530*a* and 530*b* communicates with four NVMe mass storage drives 545*a-d* and 545*e-h* through a Gen3 PCIe×4 interface 535*a* and 535*b*.

The single BMC 550 may receive management commands and returns status information via a low speed management (Ethernet) port 560, govern power and configuration of two or more network cards 510*a* and 510*b* with high speed network (Ethernet) ports 511*a* and 511*b*.

Figure 6:
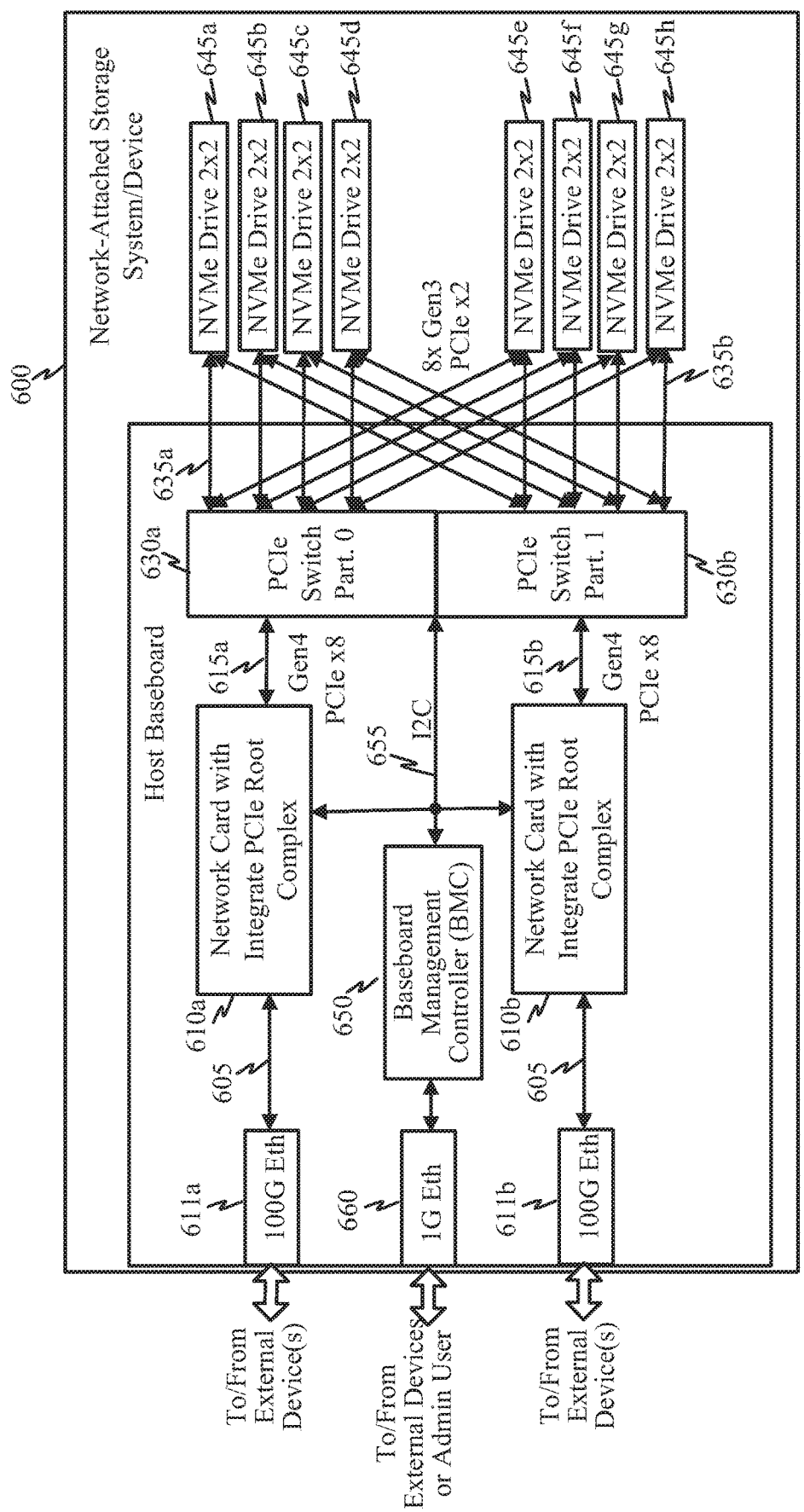
FIG. 6 is a block diagram illustrating an exemplary network-attached storage system/device providing dual peer-to-peer connectivity via dual network cards with integrated root complex functionality to a plurality of high availability NVMe storage devices.

FIG. 6 is a block diagram illustrating an exemplary network-attached storage system/device 600 providing dual peer-to-peer connectivity via dual network cards with integrated root complex functionality to a plurality of high availability NVMe storage devices. Two network cards 610*a* and 610*b*, each having a high speed Ethernet port 611*a* and 611*b*, communicate via a Gen4 PCIe×8 link 615*a* and 615*b* with two switch partitions 630*a* and 630*b* of the same PCIe switch 630 but the downstream ports are interleaved between the partitions 630*a* and 630*b* so that two downstream ports of each partition are communicating through a plurality of Gen3 PCIe×2 links 635*a* and 635*b* with each NVMe storage device/drive 645*a-h* at PCIe Gen3 speed. The dual ported NVMe storage devices/drives 645*a-h* are capable of servicing each port independent of the other. As such, there is little or no bandwidth degradation under full load. In the case that one of the network cards 610*a* or 610*b* fails, the other network card is still able to access all NVMe storage device/drive 645*a-h*. Configuration and power of the PCIe switch 630 (i.e., comprising first PCI switch partition 630*a* and second PCI switch partition 630*b*) and network cards 610*a* and 610*b* is controlled by the BMC 650 receiving commands from and returning status information to a system administrator via a low speed Ethernet port 660 or other suitable interface and communicating the control signals via an I2C bus 655 to the network cards 610*a* and 610*b* and the PCIe switch 630.

The PCIe switch 630 may be configurable to allocate/couple specific NVMe storage devices/drives 645 to the individual network cards 610*a* and/or 610*b* via specific upstream ports and/or downstream ports. The network cards 610*a* and 610*b* may be configured via the I2C bus 655 by the BMC 650. This configuration may entail partitioning of the available NVMe array space (in the NVMe storage devices 645*a-h*) into different namespaces as well as setting permissions and/or quotas for different users and monitoring the PCIe link for performance and/or errors. Rather than setting these parameters in-band as part of the PCIe traffic requested by users, decoupling the configuration from the data traffic (i.e., by using the management interface 660 and BMC 650) allows splitting the network into a data network (via network ports 611 and 611*b*) and a management network (via management port 660) that is not accessible by any user or client as an additional security feature.

In one embodiment, instead of partitioning a single switch into two partitions 630*a* and 630*b*, two separate switches with a lower port count may be used. Each PCIe switch may be addressed via its own I2C slave address.

The exemplary PCIe Gen4 busses and PCIe Gen3 busses disclosed in FIGS. 4, 5, and 6 are exemplary only and any combination of PCIe Gen(n) and Gen(n−1) busses is contemplated herein, including any emerging protocol superseding the PCIe standard.

Figure 13:
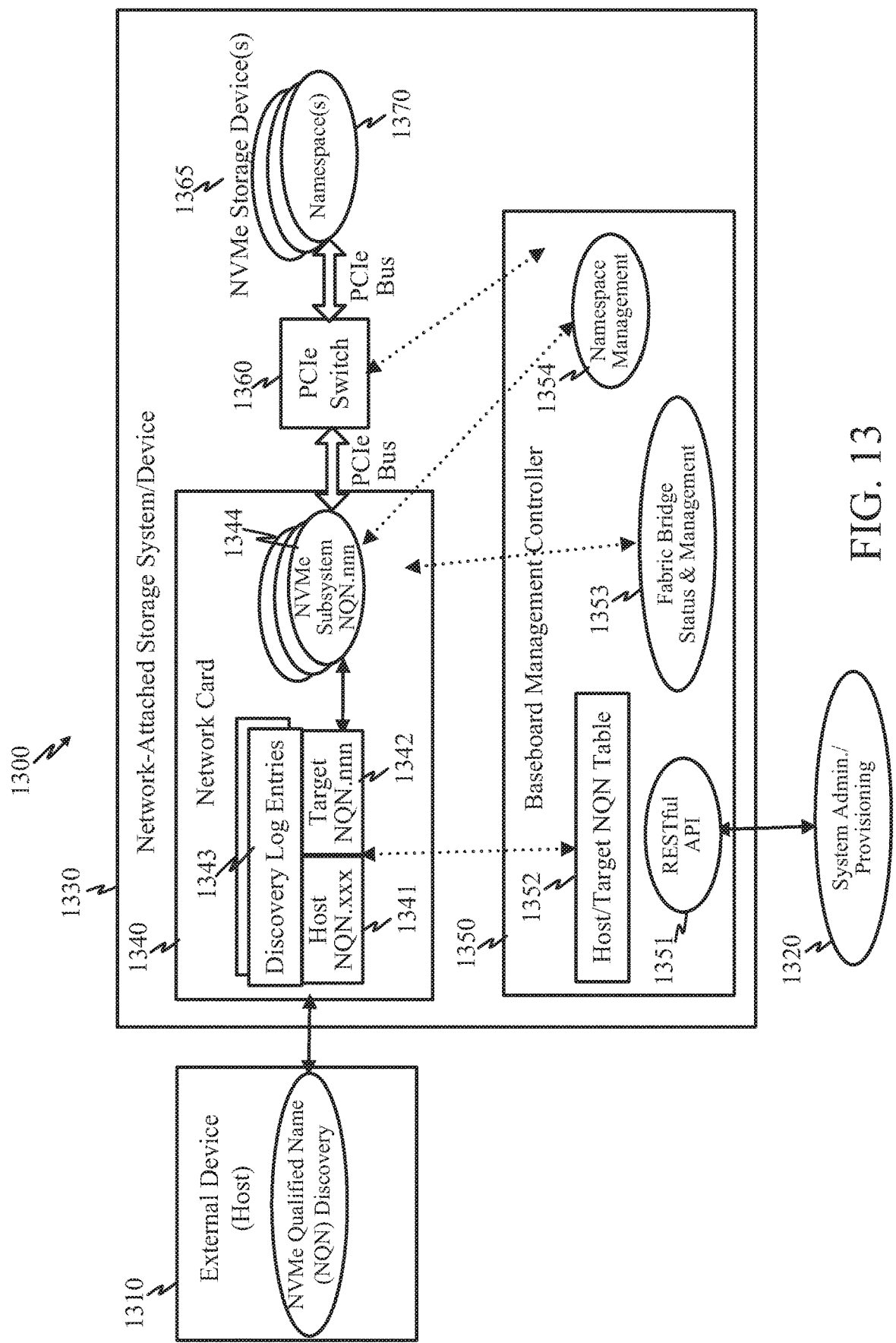
FIG. 13 illustrates an exemplary method for operating an autonomous network-attached storage device/system

FIG. 13 illustrates an exemplary method for operating an autonomous network-attached storage device/system 1330. The system 1300 comprises a host external device 1310 connected via a high speed Ethernet interface (100 GbE Fabric) with an autonomous network-attached storage device/system 1330. The autonomous network-attached storage device/system may include an autonomous network card or "fabric bridge" 1340, a baseboard management controller 1350 connected through a low speed Ethernet connection (1 GbE Management) to a System Administrator interface 1320. The system administrator provides management commands that are interpreted by the RESTful API 1351 software to create a host/Target NVMe Qualified Namespaces (Host/Target NQN Table) 1352.

The Host/Target NQN table 1352 is copied to the network card 1340 and stored as lookup table between the logical host NQN.xxx table 1341 and the physical (or logical) NVMe drive "target NQN.nnn" entries 1342. The Target NQN.nnn serves as a reference for the NVMe controllers (NVMe subsystem NQN nnn) 1344 which may be connected to the individual NVMe storage drives 1365 and namespaces 1370, either directly or via a PCIe switch 1360, using the PCIe protocol.

The BMC 1350 manages the NVMe namespaces by interfacing with the NVMe (subsystem NQN.nnn) controllers 1344, which are communicating with the upstream ports of PCIe switch 1360 via a PCIe interface. The downstream ports of PCIe switch 1360 interfaces with the individual NVMe drives and the namespaces thereon 1370.

If a discovery request is sent to the autonomous network-attached storage device/system 1330 by the host external device 1310, the network-attached storage device/system 1330 returns the discovery log entries 1343 to the external device 1310, thereby exposing a subset of the available namespaces to the external device 1310. The exposure of the namespaces is managed by the Host/Target NQN Table 1352 under control of the RESTful API 1351.

The BMC 1350 may also monitor the Fabric Bridge Status & Management 1353 and provides the information back to the sys admin 1320 via the 1 GbE management interface. The interactions between the BMC 1350 and the network card 1340 may be communicated via an I2C bus using a common electrical interface with different slave addresses for the individual target devices illustrated as separate buses for clarity purposes only.

Exemplary Autonomous Network Card with Integrated Root Complex

Figure 7:
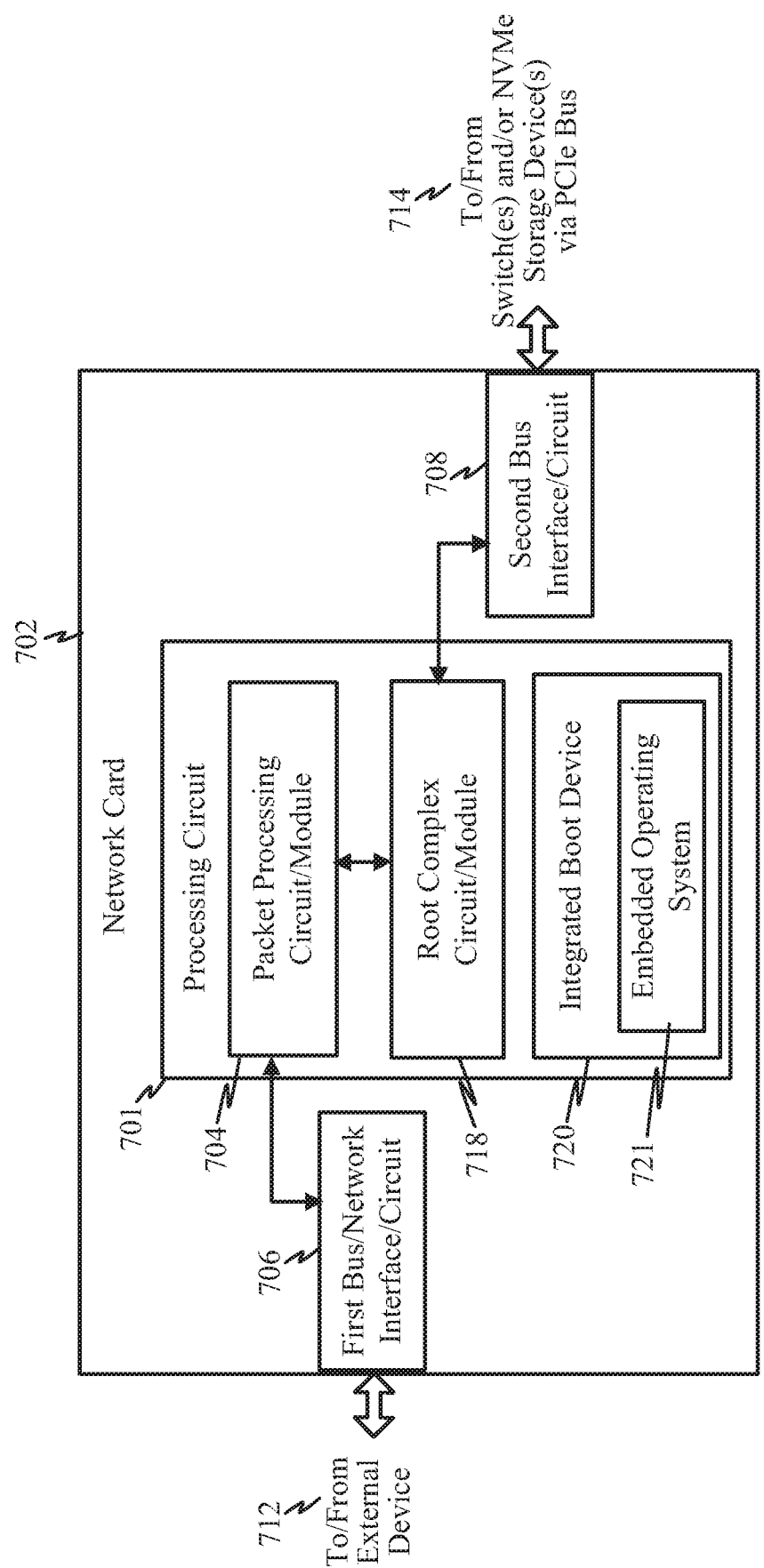
FIG. 7 is a block diagram illustrating an exemplary network card with integrated root complex.

FIG. 7 is a block diagram illustrating an exemplary network card with integrated root complex. The network card 702 may include a processing circuit 701 that may include or implement a packet processing circuit/module 704, a root complex circuit/module 718, and/or an integrated boot device 720.

The processing circuit/module 701 may be coupled to a first bus (e.g., network interface) interface/circuit 706 and a second bus interface/circuit 708 (e.g., a PCIe interface). The packet processing circuit/module 704 may be adapted to transfer packets between the first bus interface/circuit 706 and the second bus interface/circuit 708 (via the root complex circuit/module 718). In one example, the first bus interface/circuit 706 may serve to couple to an external device 712 which may read/write information from/to one or more storage device(s) 714 directly coupled or indirectly coupled (via a switch) to the second bus interface/circuit 708. The root complex circuit/module 718 may be configured to translate transaction requests (e.g., read, write, etc.) between the external device 712 and the storage device(s) 714 via a PCIe bus. For instance, in one example, the root complex circuit/module 718 may translate between a namespace specified by an external device (via the first bus/network interface circuit 706) and a physical storage space in the storage devices coupled via the root complex circuit/module 718. The processing circuit 701 may also include or implement an embedded operating system 721 (e.g., a thin operating system) stored on the integrated boot device 720 that allows the network card 702 to operate autonomously (e.g., without the management of an external host processor). As long as power is provided to the network card 702, the operating system 721 may allow the processing circuit 701 to perform one or more functions to convert and/or transfer packets between the first bus/network interface/circuit 706 and the second bus interface/circuit 708. Note that the network card 702 may thus operate even in the absence of, or without the control of, an external host processor that is typically coupled to a PCIe bus. In one example, the embedded operating system 721 may be stored in an integrated flash memory or a SATA device that is part of the network card 702.

According to one embodiment, the network card 702 may be adapted to facilitate peer-to-peer communications between external devices 712 and one or more NVMe storage devices 714. That is, the network card 702 (through one or more of its modules) may be configured to present the NVMe storage devices 714 as namespaces to the external devices 712. An NVMe storage device may have a single namespace or more than one namespace. A namespace may represent a physical/logical storage space in one or more storage devices coupled over the PCIe bus (via the second bus interface/circuit 708).

According to one aspect, the second network interface/circuit 708 may serve to couple the network card 702 to one or more storage devices without the assistance of a host processor. The first network interface/circuit 706 may serve to couple the network card 702 to a first bus or communication path different or distinct from a second bus or communication path to which the second network interface/circuit 708 couples.

Figure 8:
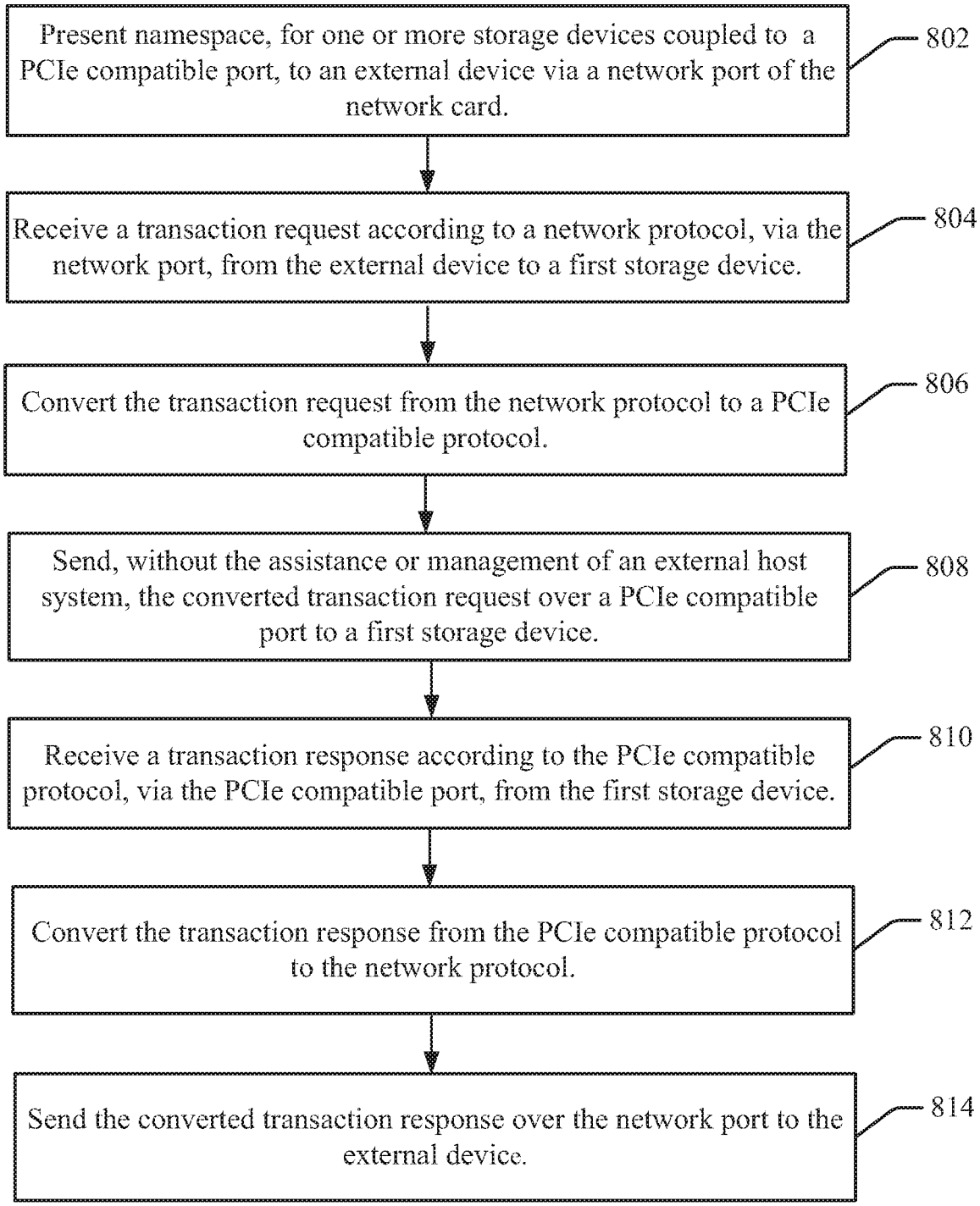
FIG. 8 illustrates a method operational by a network card to facilitate communications between a plurality of NVMe storage devices and one or more external devices.

FIG. 8 illustrates a method operational by a network card to facilitate communications between a plurality of NVMe storage devices and one or more external devices. A namespace for storage devices (e.g., NVMe devices) coupled to a PCIe compatible port is presented to an external device via a network port of the network card 802. A transaction request is received according to a network protocol, via the network port, from the external device to a first storage device 804. In one example, the network port (e.g., a network interface) may use a network protocol for communications. The transaction request is converted from the network protocol to a PCIe compatible protocol 806. The converted transaction request is then sent, without the assistance of an external host system/processor, over the PCIe compatible port to the first storage device 808. That is, the network card, with integrated root complex, is able to unilaterally send communications over the PCIe bus to the first storage device.

A transaction response may be received according to the PCIe compatible protocol, via the PCIe compatible port, from the first storage device 810. The transaction response is converted from the PCIe compatible protocol to the network protocol 812. The converted transaction response is then sent over the network port to the external device 814.

Exemplary Autonomous Network Storage Device and Methods Operational Thereon

Figure 9:
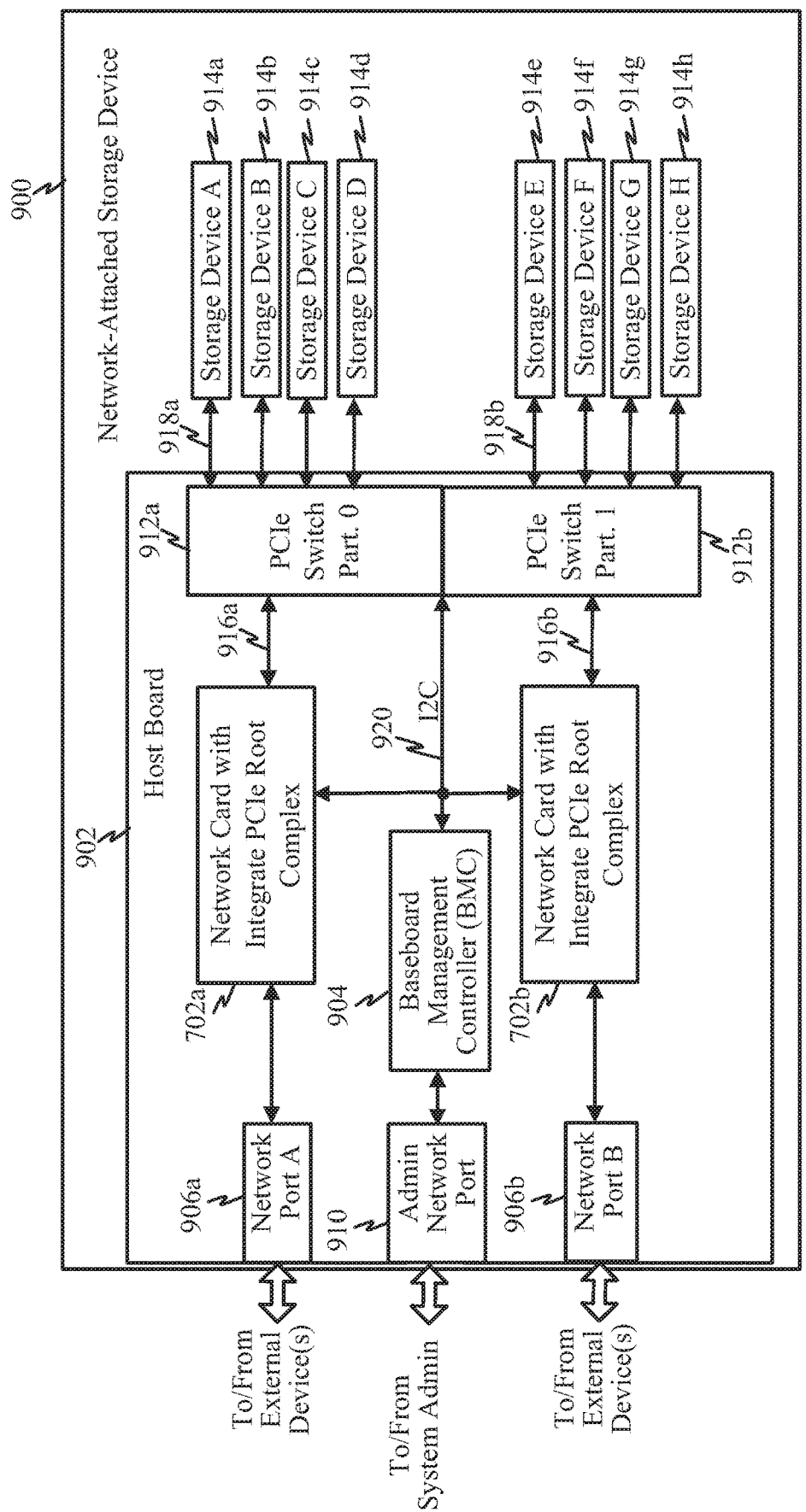
FIG. 9 is a block diagram illustrating an exemplary network-attached storage device.

FIG. 9 is a block diagram illustrating an exemplary autonomous network storage device. The autonomous network storage device 900 may include a host board 902 that includes one or more network cards with integrated PCIe root complex functionality 702 (FIG. 7), a baseboard management controller 904, one or more PCIe switches 912, and/or a plurality of non-volatile storage devices 914 (e.g., non-volatile memory express or NVMe mass storage device). Each network card 702*a* and 702*b* may be coupled to a respective network port 906*a* and 906*b* through which it may communicate with one or more external devices. Each network card 702 may also be coupled to one or more PCIe switches 912 (or PCIe switch partitions) via a first (PCIe) bus 916. The PCIe switches 912 may be coupled to the one or more storage devices 914 via a second (PCIe) bus 918. In one example, each network card 702 may be coupled to a peripheral component interconnect express (PCIe) expansion slot on the baseboard 902. The PCIe expansion slot may be coupled to a PCIe bus to which the switches 912 are coupled. However, the baseboard 902 may not include a separate host processor. Thus, each network card 702*a* and 702*b* may autonomously operate to transfer data between the external devices (via network ports 906*a* and 906*b*) and the storage devices 914*a-h* (via PCIe buses 916*a* and 916*b*). Each root complex in each network card is capable of managing communications over their respective PCIe buses 916*a* and 916*b* without the assistance of an external host processor.

The baseboard management controller 904 may be coupled to the network cards 702*a* and 702*b* and the PCIe switches 912*a* and 912*b*, via a control/management bus 920, to allow an external system administrator to configure operations of the baseboard 902 via an admin network port 910. In one example, the baseboard management controller 904 may communicate a first signal to the PCIe switch 912 via the control bus 920 (e.g., an inter-integrated circuit (I2C) bus), where the first signal may include power control and management data indicative of a selected storage device 914 (from a plurality of storage devices). The baseboard management controller 904 may communicate a second signal to network card 702*a* or 702*b* via the control bus 920, the second signal may include power control and/or management data. In one example, the second signal may be indicative of: (a) at least one of a namespace and a quota of at least one of the plurality of storage devices 914, and/or (b) at least one of a performance and an error rate of the network card 702. In this manner, baseboard management controller 904 may provide out-of-band management functionality to the network cards 702*a* and 702*b* and the PCIe switch 912*a* and 912*b*.

Each network card 702 may be include a processing circuit configured to operate as a standalone bootable device in the absence of an external host processing circuit, and may also include an integrated PCIe root complex or port to control data communications over the network port 906 and the first (PCIe) bus 916. The network card 702 may be configured to perform encryption/decryption, compression, and/or deduplication functions on data transferred from a storage device and the external device.

The network card 702 may be configured to convert the data received over the first bus 916 into a fabric/network protocol and communicate the converted data to an external device via the network port 906. In one example, the first bus 916 may include a first plurality of PCIe lanes, and the second bus 918 may include a second plurality of PCIe lanes, wherein the first plurality of PCIe lanes may be different from the second plurality of PCIe lanes.

In one example, the network card 702 may use a PCIe Gen(n) protocol to communicate data with the PCIe switch 912 via the first bus 916 (e.g., over a first number of PCIe lanes), and the PCIe switch 912 may use a PCIe Gen(n−1) protocol to communicate data with the plurality of storage devices 914 via the second bus 918 (e.g., over a second number of PCIe lanes). In one example, the second number of PCIe lanes may be greater than the first number of PCIe lanes, but the data rate of the first bus 916 may be higher than that of the second bus 918. According to one aspect, at least one PCIe lane of the second bus 918 may be selected by the switch 912 and/or baseboard management controller 904 such that the PCIe switch 912 may communicate data to a selected storage device 914 via the at least one selected PCIe lane.

According to one aspect, the admin network port 910 may be functionally coupled to the management controller 904 and configured to communicate data between the management controller 904 and an external server/device (e.g., a system administrator). The network port 906 may be functionally coupled to the network card 702 and configured to communicate data between the network card 702 and an external device, wherein the network port 906 may support a higher data communication data rate than the admin network port 910.

In one implementation of the exemplary autonomous network storage device 900, a first network card 702*a* may exchange signals with a first partition of the PCIe switch 912*a* while a second network card 702*b* may exchange signals with a second partition of the PCIe switch 912*b*.

In some examples, the storage devices 914 may be dual ported (as illustrated in 645 FIG. 6) and each port is configured to communicate with a downstream port of one of the partitions of the PCIe switch 912. The different partitions PCIe switch partitions 912*a* and 912*b* may be addressable with different slave addresses of the control (I2C) bus 920.

Figure 10:
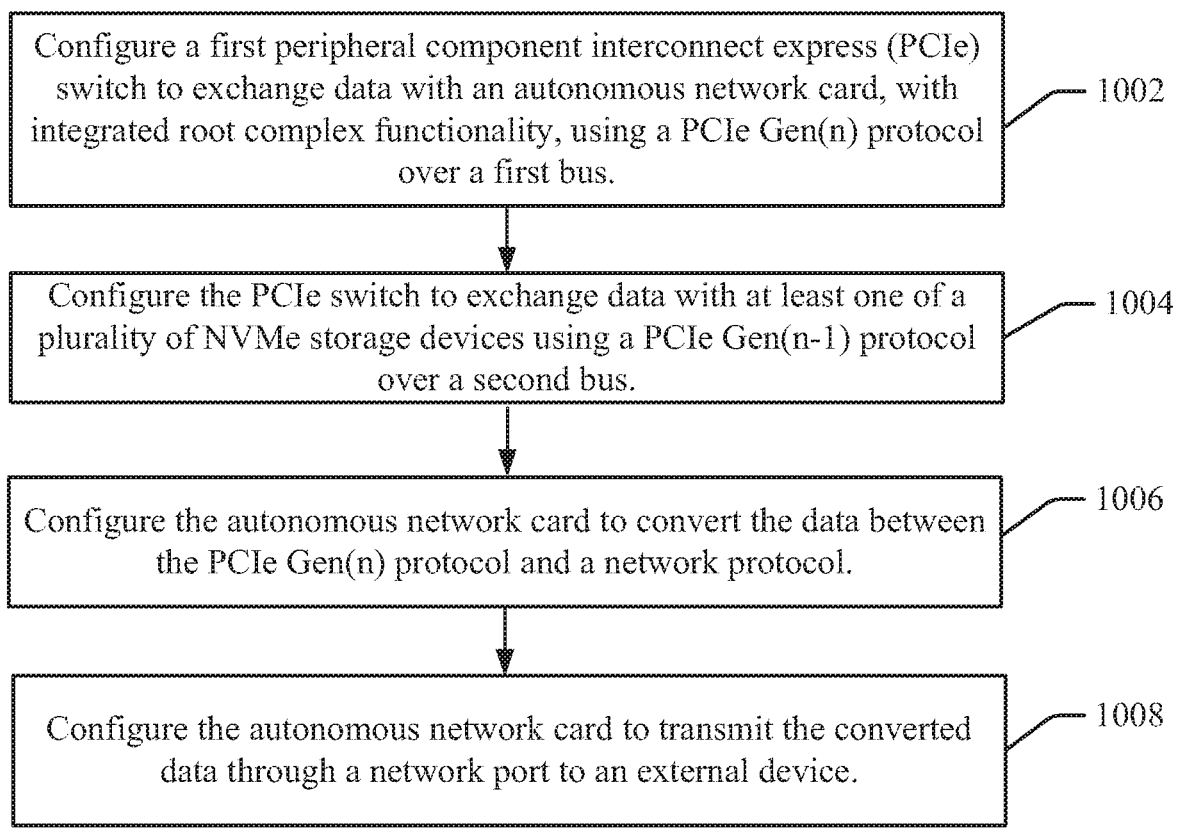
FIG. 10 illustrates a method to configure an autonomous network-attached storage device to facilitate communications between a plurality of non-volatile storage devices and one or more external devices.

FIG. 10 illustrates a method to configure an autonomous network-attached storage device to facilitate communications between a plurality of non-volatile storage devices and one or more external devices. In some examples, one or more steps of the method described in FIG. 10 may be implemented by the devices and/or systems of FIGS. 4, 5, 6, 7, and/or 9.

A first peripheral component interconnect express (PCIe) switch may be configured to exchange data with an autonomous network card, with integrated root complex functionality, using a PCIe Gen(n) protocol over a first bus 1002. That is, the network card may include an embedded operating system that allows the network card to operate without the assistance of an external processor or system. Additionally, the network card's integrated root complex functionality allows the network card to manage or arbitrate communications over a PCIe bus without dependence on an external processor or system.

The PCIe switch may be further configured to exchange data with at least one of a plurality of NVMe storage devices using a PCIe Gen(n−1) protocol over a second bus 1004. The autonomous network card may be configured to convert the data between the PCIe Gen(n) protocol and a network protocol 1006. The autonomous network card may be further configured to transmit the converted data through a network port to an external device 1008.

Figure 11:
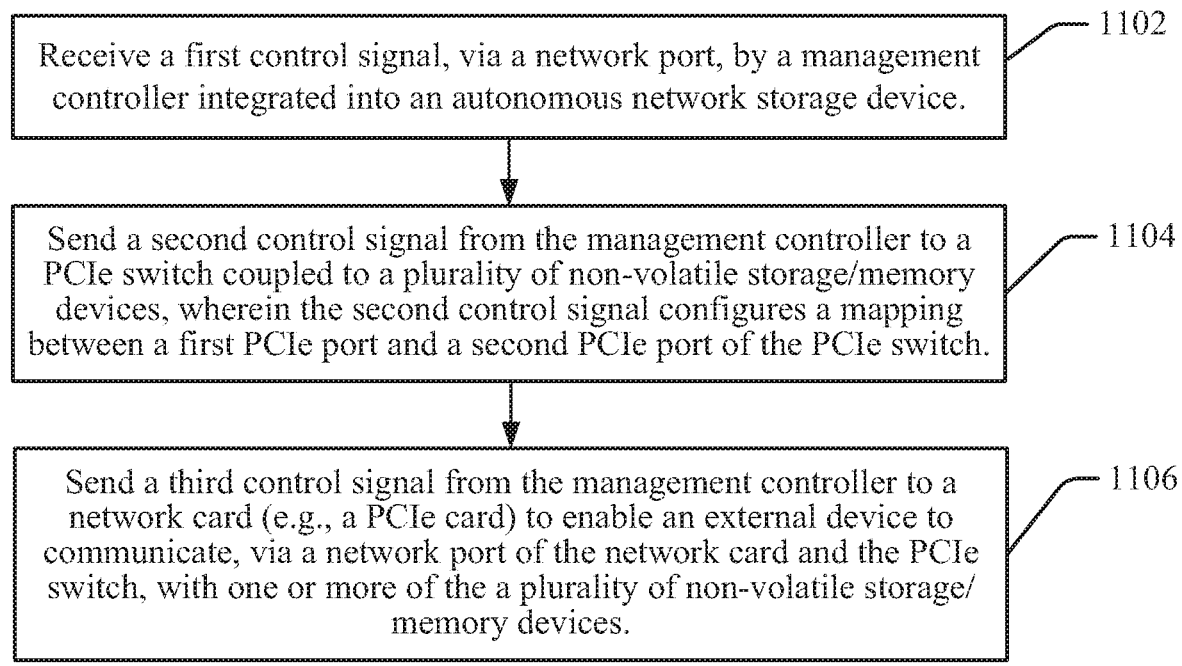
FIG. 11 illustrates a method operational by an autonomous network-attached storage device to facilitate communications between a plurality of non-volatile storage devices and one or more external devices.

FIG. 11 illustrates a method operational by a management controller coupled to an autonomous network-attached storage device to provide out-of-band management functionality (use the management interface for namespace, separate) between a plurality of non-volatile storage devices and one or more external devices. A first control or management signal may be received, via a network port, by a management controller integrated into the autonomous network storage device 1102. A second control signal may be sent from the management controller to a PCIe switch coupled to a plurality of non-volatile storage/memory devices, wherein the second control signal configures a mapping between a first PCIe port and a second PCIe port of the PCIe switch 1104. That is, such mapping translates between the lanes of the first PCIe port and the lanes of the second PCIe port. In one example, the second control signal may be sent over an I2C bus to the PCIe switch. The second control signal may serve to partition and/or configure one or more PCIe ports of the PCIe switch to facilitate an exchange of first PCIe signals over a first set of PCIe lanes of a first PCIe bus with a network card. In one example, the first PCIe bus may operate according to a PCIe Gen(n) protocol (e.g., generation n). The PCIe switch may also exchange second PCIe signals and data with the plurality of non-volatile storage/memory devices over a second set of PCIe lanes of a second PCIe bus using a PCIe Gen (n−1) protocol (e.g., generation n−1), where the second set of PCIe lanes has more lanes than the first set of PCIe lanes.

Alternatively, the first control signal may be communicated "in band" via the high speed network interface directly to the network card.

The management controller may also send a third control signal to the network card (e.g., a PCIe card) to enable an external device to communicate, via a network port of the network card and the PCIe switch, with one or more of the plurality of non-volatile storage/memory devices 1106. In one example, the third control signal may serve to configure the network card to perform one or more of the following functions: setting namespaces for the non-volatile storage devices, setting use quotas, monitoring PCIe bus performance and errors. In this manner, the management controller may configure one or more components of the autonomous network-attached storage device to facilitate data exchanges between an external network device and the one or more of the plurality of non-volatile storage/memory devices.

Figure 12:
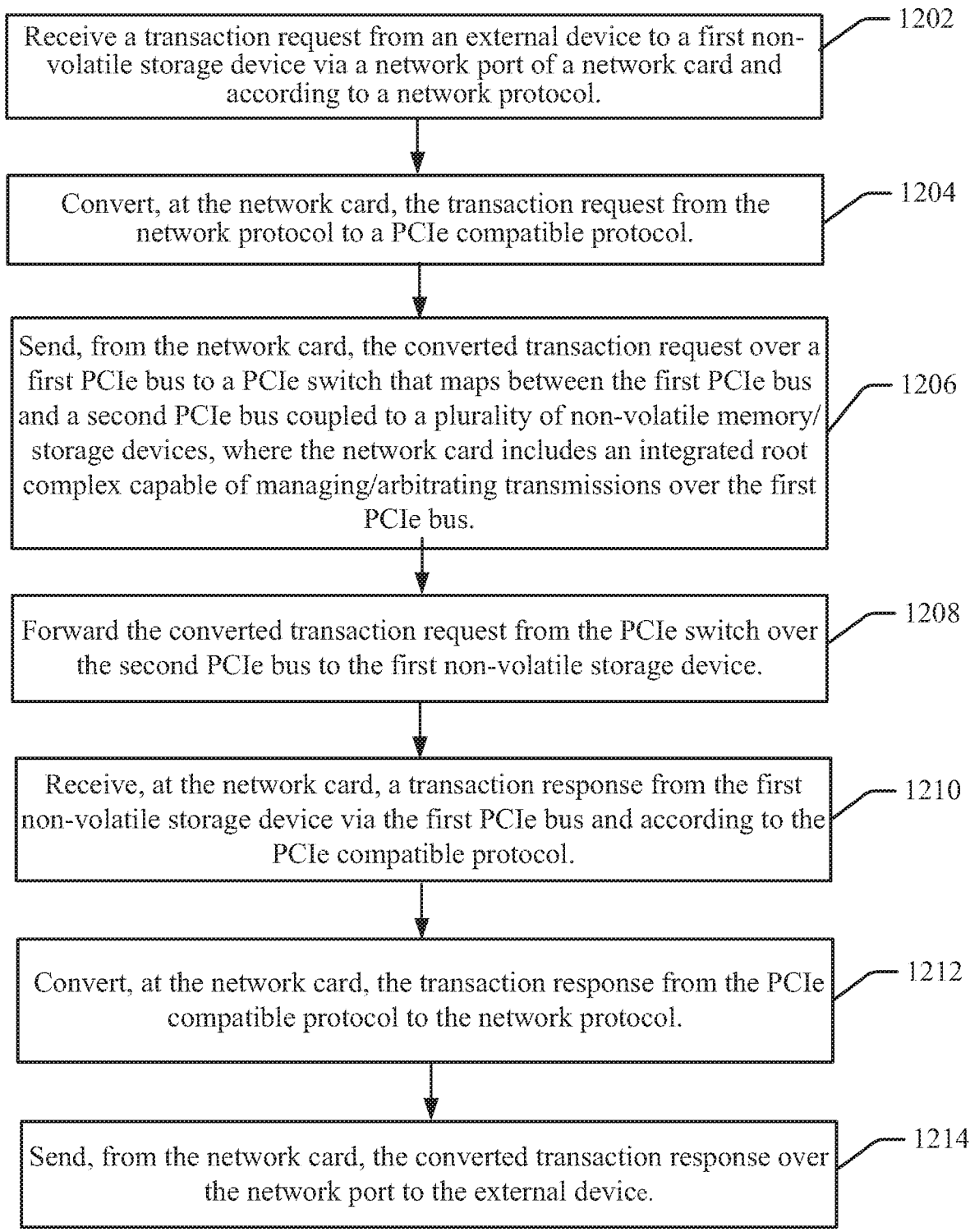
FIG. 12 illustrates a method operational in an autonomous network-attached storage device to facilitate communications between a plurality of non-volatile storage devices and one or more external devices.

FIG. 12 illustrates a method operational in an autonomous network-attached storage device to facilitate communications between a plurality of non-volatile storage devices and one or more external devices. A transaction request may be received from an external device to a first non-volatile storage device via a network port of a network card and according to a network protocol 1202. In various examples, the network protocol may be a high speed Ethernet or Fibre Channel protocol. The transaction request may be converted, at the network card, from the network protocol to a PCIe compatible protocol 1204. The converted transaction request may then be sent, from the network card, over a first PCIe bus to a PCIe switch that maps between the first PCIe bus and a second PCIe bus coupled to a plurality of non-volatile memory/storage devices, where the network card includes an integrated root complex capable of managing/arbitrating transmissions over the first PCIe bus and/or the second PCIe bus 1206. The converted transaction request may be forwarded from the PCIe switch over the second PCIe bus to the first non-volatile storage device 1208.

A transaction response may be received, at the network card, from the first non-volatile storage device via the first PCIe bus and according to the PCIe compatible protocol 1210. The transaction response may be converted, at the network card, from the PCIe compatible protocol to the network protocol 1212. The converted transaction response may then be sent, from the network card, over the network port to the external device 1214.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

Accordingly, the various features associate with the examples described herein and shown in the accompanying drawings can be implemented in different examples and implementations without departing from the scope of the disclosure. Therefore, although certain specific constructions and arrangements have been described and shown in the accompanying drawings, such implementations are merely illustrative and not restrictive of the scope of the disclosure, since various other additions and modifications to, and deletions from, the described implementations will be apparent to one of ordinary skill in the art. Thus, the scope of the disclosure is only determined by the literal language, and legal equivalents, of the claims which follow.

What is claimed is:

1. A network-attached storage device, comprising:
a first network card including an embedded operating system that provides autonomous operation of the first network card including autonomous communication operations with a first external device without assistance of an external host process or system, a first network port to communicate with the first external device, and a first peripheral component interconnect express (PCIe) interface to couple to a first PCIe bus;
a second network card including an embedded operating system that provides autonomous operation of the second network card including autonomous communication operations with a second external device without assistance of an external host process or system, a second network port to communicate with the second external device, and a second peripheral component interconnect express (PCIe) interface to couple to a second PCIe bus;
a PCIe switch coupled to the first network card via the first PCIe bus and coupled to the second network card via the second PCIe bus, the PCIe switch coupled to a third PCIe bus through which both the first network card and the second network card access a shared storage space; and a plurality of dual-ported non-volatile storage devices coupled to the PCIe switch via the third PCIe bus, wherein the first network card is configured to convert transmissions between a network protocol used over the first network port and a PCIe compatible protocol used over the first PCIe bus to facilitate signal and/or data exchanges between at least one of the plurality of non-volatile storage devices and the first network port to the first external device, and wherein the second network card is configured to convert transmissions between a network protocol used over the second network port and a PCIe compatible protocol used over the third PCIe bus to facilitate signal and/or data exchanges between at least one of the plurality of non-volatile storage devices and the second network port to the second external device;

wherein each of the non-volatile storage devices are configured to independently service requests from both the first network card and second network card, concurrently, through its dual ports.

2. The network-attached storage device of claim 1, wherein the embedded operating system provides stand-alone operation of the first network card even in the absence of a host processing circuit.

3. The network-attached storage device of claim 1, wherein the first network card is further configured to perform PCIe root complex functionality to control data communications over the first PCIe bus and/or the second PCIe bus.

4. The network-attached storage device of claim 1, further comprising:
a management controller coupled to the first network card, the second network card, and PCIe switch via a control bus.

5. The network-attached storage device of claim 1, wherein the first PCIe bus includes a first plurality of PCIe lanes, and the second PCIe bus includes a second plurality of PCIe lanes.

6. The network-attached storage device of claim 5, wherein a PCIe Gen(n) protocol is used to communicate over the first PCIe bus via the first plurality of PCIe lanes, and a PCIe Gen(n−1) protocol is used to communicate over the second PCIe bus to the plurality of dual-ported non-volatile storage devices via the second plurality of PCIe lanes.

7. The network-attached storage device of claim 5, wherein the second plurality of PCIe lanes is greater than the first plurality of PCIe lanes.

8. The network-attached storage device of claim 1, wherein the first network card is configured to:
receive a transaction request according to the network protocol, via the first network port, from the first external device to a first non-volatile storage device;
convert the transaction request from the network protocol to the PCIe compatible protocol;
send the converted transaction request over the first PCIe bus to the first non-volatile storage device;
receive a transaction response according to the PCIe compatible protocol, via the first PCIe bus, from the first storage device;
convert the transaction response from the PCIe compatible protocol to the network protocol; and
send the converted transaction response over the first network port to the first external device.

9. The network-attached storage device of claim 8, wherein the transaction request is a read operation or a write operation.

10. The network-attached storage device of claim 1, wherein the first network card converts a namespace provided by the external device to a namespace within one of the plurality of non-volatile storage devices.

11. A method operational at a network-attached storage device, comprising:
receiving a transaction request from a first external device to a first dual-ported non-volatile storage device via a network port of a first network card and according to a network protocol, wherein the first network card includes an embedded operating system that provides autonomous operation of the first network card including autonomous communication operations with the first external device without assistance of an external host process or system, the first network card including a first network port to communicate with the first external device, and a first peripheral component interconnect express (PCIe) interface to couple to a first PCIe bus;
converting, at the first network card, the transaction request from the network protocol to a PCIe compatible protocol;
sending, from the first network card, the converted transaction request over the first PCIe bus to a PCIe switch that maps between the first PCIe bus and a second PCIe bus coupled to a plurality of dual-ported non-volatile storage devices, wherein each non-volatile storage device is configured to independently service requests from at least two network cards, concurrently, through its dual ports; and
forwarding the converted transaction request from the PCIe switch over the second PCIe bus to the first non-volatile storage device.

12. The method of claim 11, wherein the first PCIe bus includes a first plurality of PCIe lanes, and the second PCIe bus includes a second plurality of PCIe lanes, a PCIe Gen(n) protocol is used to communicate over the first PCIe bus via the first plurality of PCIe lanes, and a PCIe Gen(n−1) protocol is used to communicate over the second PCIe bus to the plurality of non-volatile storage devices via the second plurality of PCIe lanes.

13. The method of claim 12, wherein the second plurality of PCIe lanes is greater than the first plurality of PCIe lanes.

14. The method of claim 11, further comprising:
receiving, at the network card, a transaction response from the first non-volatile storage device via the first PCIe bus and according to the PCIe compatible protocol;
converting, at the network card, the transaction response from the PCIe compatible protocol to the network protocol; and
sending, from the network card, the converted transaction response over the network port to the external device.

15. A network card, comprising:
a network interface configured for communication with an external device;
a peripheral component interconnect express (PCIe) bus interface to couple to a plurality of non-volatile storage devices via a PCIe bus;
a processing circuit coupled to the network interface and the PCIe bus, the processing circuit implementing an integrated boot system with an embedded operation system that provides autonomous operation of the network card including autonomous communication operations with the external device via the network interface without assistance of an external host process or system, the network card further configured to:

map addresses for the plurality of non-volatile storage devices between the network interface and the PCIe bus interface, receive a transaction request according to a network protocol, via a network port, from an external device to a first storage device, convert the transaction request from the network protocol to a PCIe compatible protocol, send the converted transaction request over a PCIe bus interface to a first non-volatile storage device.

16. The network card of claim 15, wherein the processing circuit is further configured to receive a transaction response according to the PCIe compatible protocol, via the PCIe bus interface, from the first storage device, convert the transaction response from the PCIe compatible protocol to the network protocol, and send the converted transaction response over the network port to the external device.

17. The network card of claim 15, further comprising:

a control bus to couple to an external management controller that configures the operation of the network card.

* * * * *